Figure 1:
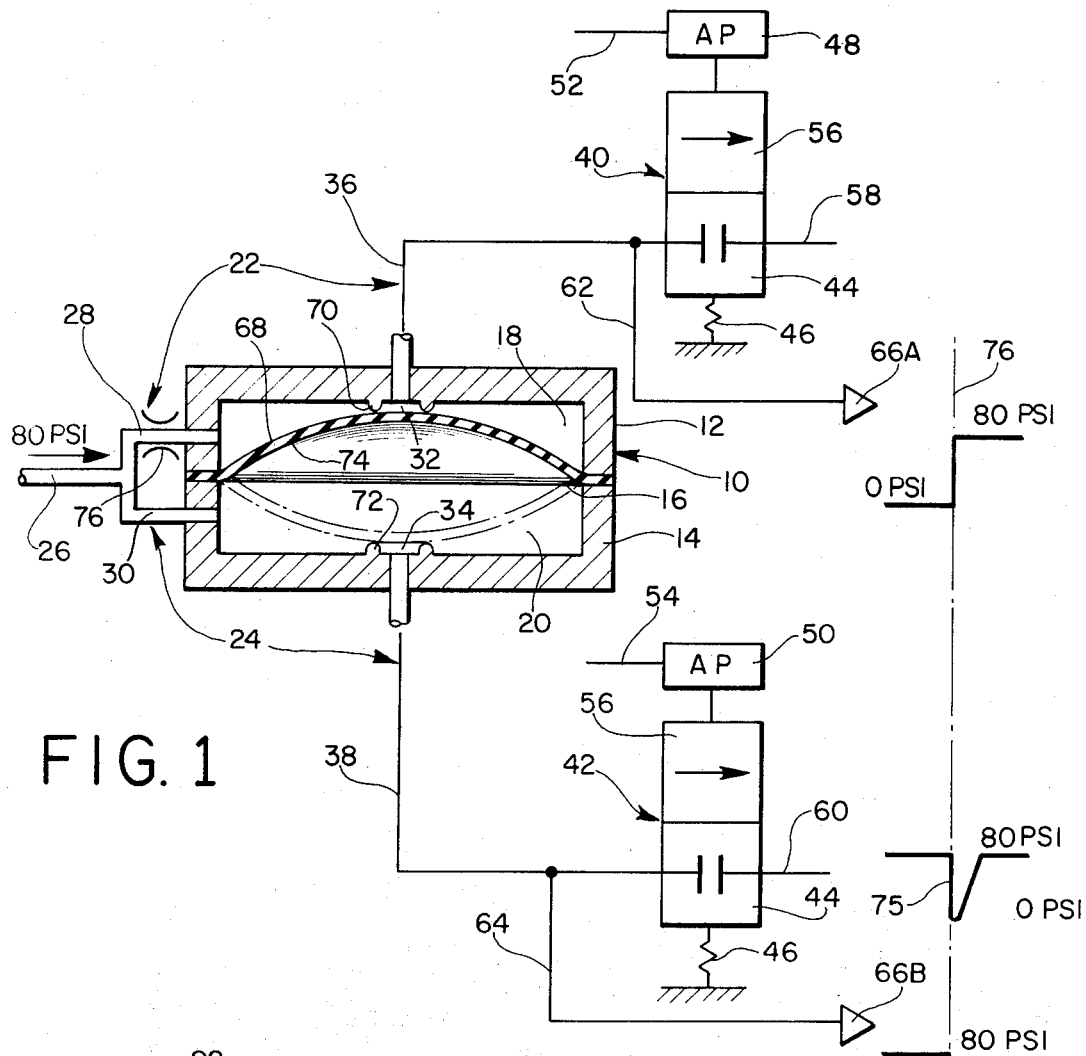

United States Patent
Cowan et al.

[11] 3,789,864
[45] Feb. 5, 1974

[54] FLUID OPERATED SYSTEM

[75] Inventors: Larry C. Cowan, Saunderstown; Edward A. Rubel, East Greenwich, both of R.I.

[73] Assignee: Leesona Corporation, Cranston, R.I.

[22] Filed: Apr. 9, 1973

[21] Appl. No.: 349,635

Related U.S. Application Data

[63] Continuation-in-part of Ser. No. 179,844, Sept. 13, 1971, abandoned.

[52] U.S. Cl. .................................. 137/119, 137/821
[51] Int. Cl. ............................................. F15c 3/04
[58] Field of Search ........... 137/119, 819, 821, 829; 235/201 ME

[56] References Cited
UNITED STATES PATENTS

| | | | |
|---|---|---|---|
| 3,641,529 | 2/1972 | Bitzer et al. | 251/129 X |
| 3,335,950 | 8/1967 | Tal et al. | 235/201 ME |
| 3,540,477 | 11/1970 | Hogel | 235/201 ME |
| 2,778,373 | 1/1957 | Jaquith | 137/112 |
| 2,992,652 | 7/1961 | Fellberg | 137/118 |
| 3,433,257 | 3/1969 | Jensen | 235/201 ME |

*Primary Examiner*—William R. Cline
*Attorney, Agent, or Firm*—Albert P. Davis; Burnett W. Norton

[57] ABSTRACT

A fluid pulse operated system provides selective output for operating a fluid device, such as reversing operation of a fluid motor, or memory device in a logic environment. The system includes a pair of chambers separated by a flexible diaphragm. Fluid paths, one through each of the chambers, each includes an inlet for pressurized fluid into the associated chamber and a chamber outlet connected with a normally closed vent valve. Output signal lines are provided in the paths, one between each of the outlets and the associated vent valve, for connection with the motor or providing memory signals. The diaphragm serves as a valve member which selectively cooperates with one of a pair of valve seats, one for each of the outlets, for closing the selected outlet. During normal operation of the system either of the outlets may be open and the other closed by the diaphragm which is releasably retained in its selected closed position by a differential in facial area of opposite sides of the diaphragm exposed to fluid in the respective chambers. In order to reverse the diaphragm, thereby opening the previously closed outlet and closing the formerly open outlet, the vent associated with the outlet to be closed is momentarily opened, thereby reducing the fluid pressure in the associated chamber and causing the diaphram to reverse its position and seat against the valve seat about the outlet to be closed. The system operates with little power while pulsing through a control cycle and stands by with no power in a static condition, by provision of positive fluid pressure, being decreased by control pulses and by provision of gating structures sealing off leakage paths in static condition.

12 Claims, 2 Drawing Figures

FLUID OPERATED SYSTEM

This application is a continuation-in-part of pending application Ser. No. 179,844 filed Sept. 13, 1971, now abandoned.

This invention relates to a fluid pulse operated system and, more particularly, to such a system for alternately opening and closing a pair of output signal lines by control of temporary fluid pulses.

Various fluid operated systems are known for providing a bidirectional valve action, but these systems generally require rather involved and expensive design in order to assure reliable operation. Fluid operated systems are also known for providing logic functions including memories such as U.S. Pat. No. 3,483,258, but these systems generally require large quantities of fluid, often constantly dissipated, and normally operate at relatively low pressures which are inadequate for performing a work function without the use of an interface, which further increases cost.

It is a primary object of this invention to provide a new and useful more efficient fluid operated system. A related object is such a system providing a bidirectional valve. Another related object is such a system providing a logic function.

Another object of this invention is provision of a new and useful fluid operated system including a pair of chambers with fluid paths through each of the chambers, each of the paths including an outlet for fluid from the associated chamber, and valving for selectively and releasably retaining either of the outlets closed responsive to a differential in areas of a valve member, the differential in areas being responsive to fluid in the chambers for retaining the valving in closed relationship with the selected one of the outlets. A related object is provision of the valve member in the form of a flexible diaphragm which selectively cooperates with valve seats, one about each of the outlets, for closing the selected outlet. Another related object is provision of normally closed vent valve means, one downstream of each of the outlets, for venting fluid from the associated chamber when its outlet is opened, to cause the diaphragm to close the last noted outlet. Another related object is provision of output lines, at least one between each of the outlets and the associated vent valve.

Figure 2:
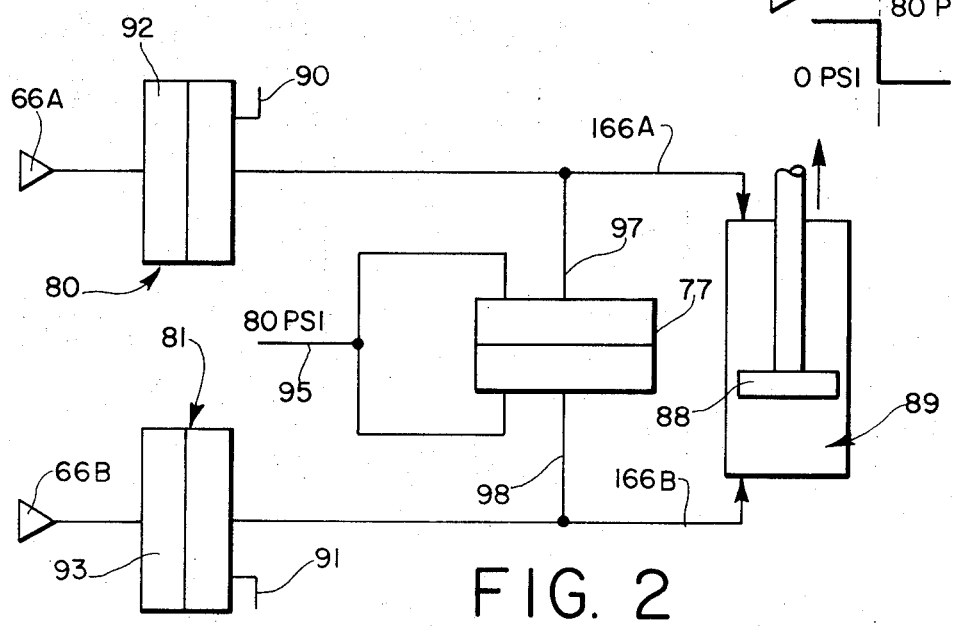

These and other objects and advantages of the invention will be apparent from the following description and the accompanying drawing which shows in FIG. 1 a schematic fluid circuit diagram of a bistable device partially in section and which shows in FIG. 2 a schematic circuit diagram of a load system driven by the bistable circuit.

Referring to FIG. 1 of the drawing, a split housing 10 has clamped between its housing halves 12 and 14 a flexible diaphragm 16 to define a pair of chambers 18 and 20. The halves of the housing are suitably held in sealed engagement with the periphery of the diaphragm 16 in any suitable manner (not shown). Fluid paths 22 and 24 pass through each of the chambers 18 and 20, respectively. A supply line 26 provides a supply of pressurized fluid, such as air at 80 psi, for example, to branch lines 28 and 30 of the paths 22 and 24, one of the branch lines opening into each of the chambers 18 and 20 and providing an inlet port into the respective chamber. The paths 22 and 24 also include outlet ports 32 and 34, one from each of the chambers 18 and 20, respectively. Each outlet 32 and 34 is connected by an associated outlet line 36 and 38, respectively, with normally closed vent valves 40 and 42, respectively.

As illustrated in the drawing each vent valve is conventionally illustrated by the lower square 44 in closed position, to which position it is normally urged in any suitable manner, as by a compression spring 46. These vent valves may be urged to open position in any suitable manner, for example by manually operated actuators or, as illustrated, by air pilot actuators 48 and 50, respectively, which in turn are actuated by any suitable control system having a control lines 52 and 54 to the air pilots 48 and 50, respectively. When either actuator 48 or 50 is operated the associated vent valve moves to open position, conventionally illustrated by upper squares 56 having arrows therein, and connects the associated outlet line 36 or 38 with venting outlet 58 or 60 of the respective vent valves. Output signal lines 62 and 64 are connected into the outlet lines 36 and 38, respectively, between the associated outlets and vent valves.

As shown in the drawing both of the vent valves 40 and 42 are in their normally closed positions and fluid pressure from the supply line 26 passes through the branch line 30 and the lower chamber 20, through the outlet 34, the outlet line 38 and into the output signal line 64 which terminates in a fluid operated load 66, as illustrated by a triangle convention. For example, these loads may be opposite ends of a low volume pneumatic cylinder motor, or they may be logic devices. Under these circumstances the outlet 32 of the upper chamber 18 is closed by an upper face 68 of the diaphragm 16, the diaphragm providing a valve member seated in closed engagement with any suitable valve seat 70 associated with the upper outlet 32, a similar seat 72 being provided the outlet 34. As herein illustrated annular valve seats 70 and 72 are formed integrally with the housing 10 and encircle the outlet 32 and 34, respectively. The diaphragm 16 remains in closed engagement with the valve seat 70 because of a differential in areas, exposed to fluid in the chambers, of the upper face 68 of the diaphragm and its lower face 74. As may be noted in the drawing, the entire area lower face 74 of the diaphragm 16 is exposed to fluid pressure in the lower chamber 20, but the upper face 68 of the diaphragm is exposed to substantially the same fluid pressure in the upper chamber 18 but along a smaller area which is the total area of the face 68 less the area of the face 68 which covers the valve seat 70.

Upon momentarily opening the lower vent valve 42 as indicated by the fluid pulse waveform at vent 60, the pressure in the lower chamber 20 is dissipated to atmosphere, for example, through the venting line 70, thereupon the pressure in the upper chamber substantially exceeds the pressure in the lower chamber so that the pressure times the area of the upper face of the diaphragm on which the fluid is acting exceeds the pressure times the area of the lower face of the diaphragm, and the diaphragm 16 snaps into closing engagement with the lower valve seat 72, as shown by phantom lines, and remains in this position until the upper vent valve 40 is opened. It is only necessary to momentarily retain the appropriate vent valve open and leak fluid to the atmosphere in order to actuate the diaphragm which then remains in place without further power dissipation.

Depending on idiosyncrasies of the overall system a slight restriction 76 may be provided, if desired, in one of the inlet branches, as 28, for example, so that upon initially applying operating fluid from the supply line 26 to the paths 22 and 24 the diaphragm 16 will always move to a predetermined position. As illustrated, upon initiating operation of the system the diaphragm 16 will move into closing engagement with the upper valve seat 70 because the passage of fluid into the upper chamber 18 is retarded, thereby creating a pressure differential in the chambers, with the higher pressure in the lower chamber 20. Under static conditions these pressures finally substantially equalize.

No other restrictions are provided in the logic fluid paths disclosed herein, so that fluid may freely flow through the circuits unless blocked by diaphragm control within the logic elements.

The operation of the FIG. 1 embodiment is typified by the wave form diagram adjacent the various fluid lines 60, 66 as referenced to time datum line 76. Thus, assume that the diaphragm 68 as shown blocks output line 66A so that the pressure level is 0, and conversely provides 80 psi to the output line 66B at some time before 76. Then if vent valve 42 on the high pressure outlet side 38 is opened momentarily as shown by the pulse waveform 75 near vent outlet 60, it results in a reversal of the diaphragm to the phantom position and reverses the pressure levels at 66A and 66B. It is noted that the venting need only reduce pressure enough that the source pressure in the opposite chamber operating on a reduced diaphragm surface area will force the diaphragm into seating arrangement with the opposite outlet port, and need not necessarily go to zero or atmospheric pressure.

FIG. 2 sets forth in schematic circuit diagram a typical logic output circuit controlled by the bistable element 10 of FIG. 1 at the output leads 66. A further bistable logic element 77 is shown schematically which controls from output leads 166A and 166B a piston 88 in cylinder 39.

Elements 80 and 81 are slave gate units used in conjunction with bistable device 10 to provide a system where all logic functions are performed momentarily by pulse signals without requiring stand-by continuous logic power flow from the 80 psi fluid source. Only that continuous power is necessary to drive a load device such as piston 88 through a power stroke, and when the piston is at either end of the cylinder, no further leakage of the pressure from the 80 psi source occurs. Thus an efficient logic system is produced by means of the logic elements system taught by this invention. It is noted also that by use of a high pressure fluid source, at 80 psi for example, the logic trigger pulses needed to control the power in the system are very low powered, requiring only a momentary dropping of the source pressure by venting, or the like.

Accordingly the bistable element 10 is not only a storage device providing power output continuously to a load in response to a low power trigger pulse, but it affords a control system that effectively uses power in the logic control elements only temporarily and avoids continuous power losses in the logic elements during static conditions or during delivery of power to load devices. In essence the power amplification and storage functions afforded by the bistable element is made possible by blocking out a portion of the diaphragm being subjected to the fluid power source pressure on one side of the diaphragm to thereby cause in a storage state two different diaphragm areas to receive the common source pressure at 80 psi. Also by use of the high pressure fluid source with momentary reduced pressure control signals the logic network power consumption is minimized and permits control without access to an alternative fluid supply pressure.

Now referring to operation of the system of FIG. 2, it is noted that schematically the supply lines to be blocked by the diaphragm are shown centrally on the devices and those to have communication with the chambers on either side of the diaphragm are shown off-center. Thus, vents 90 and 91 are supplied by slave gates 80, and 81, and closed compartments 92, 93 have no output vents but merely follow in slavelike fashion the pressure established by bistable element 10 of FIG. 1 appearing at lines 66A and 66B. Accordingly the bistable elements do not leak fluid and the only fluid leakage from the logic circuit of FIG. 1 is that of the vent lines 58 and 60 comprising momentary logic trigger control pulses, to thereby control an output system without standby logic power consumption.

Consider the elements 80 and 81 to be in the condition before time 76 where line 66A is at 0 and line 66B is at 80 psi. Then element 81 would have vent 91 blocked by 80 psi pressure in chamber 93, and vent 90 would be open. Correspondingly the power bistable unit 77 would have upper compartment lead 97 blocked and lower compartment lead 98 open. This supplies supply source fluid at high pressure from input line 95 to outlet 166B and tends to move piston 88 upward as shown by the arrow, venting cylinder 98 at vent 90 until the piston reaches the end of the compartment to reach a static position where no standby fluid power leakage is required even to drive the load. Accordingly, actuation of one of the vent valves 40 and 42 can be used to cause the cylinder to move over one stroke in a corresponding direction provided the bistable element has a high pressure chamber that can be vented thereby. Continuous oscillation can take place if the piston 88 or an intermediate mechanism serves at the end of the piston stroke to operate control valves 40, 42 at leads 52, 54 for example. In the latter mode, the only control logic power required is the momentary pulse leakage from the source as the bistable device is triggered at each end of the piston stroke.

It is to be recognized that the system provided by this invention has afforded improved fluid logic systems (1) operable from a single fluid source pressure to transfer fluid flow without reduced pressure and maintain the source pressure at controlled logic or load positions, (2) operable from trigger or logic control pulses which require no power from external fluid sources and which use only momentary leakage without continuous leakage from the fluid source to maintain logic control states, and (3) operable to store or delay a static condition in response to a momentary pulse, thereby providing improved and efficient logic elements, modes of operation and logic control systems.

Thus the system has a plurality of logic elements connected to form a logic sequence when initiated by a trigger pulse, where the elements are provided with fluid flow paths only permitting momentary fluid flow and thereafter a closed fluid flow path static condition.

While this invention has been described with reference to a particular embodiment in particular environments various changes may be apparent to one skilled in the art and the invention is therefore not to be limited to such embodiments or environments except as set forth in the appended claims.

What is claimed is:

1. A fluid operated system comprising, a logic element including a pair of chambers with each chamber having a fluid flow path from inlet port means introducing and outlet port means exhausting fluid under pressure, a flexible impervious diaphragm held between said chambers isolating the fluid flow paths in the two chambers and having a portion thereof movable into a predetermined one of said outlet ports as a function of differential pressures in said chambers on opposite sides thereof to thereby block the exhaust of fluid through said predetermined outlet port and impede the fluid flow path therethrough, a source of fluid under pressure and means introducing it simultaneously into each inlet port to thereby tend to maintain in both said chambers the same pressure, and trigger signal means coupled to said outlet ports for selectively momentarily reducing pressure at one of said outlet ports not blocked by said diaphragm to thereby introduce a differential pressure to control the position of the diaphragm to move into the opposite outlet port and block said exhaust therethrough, and structure at said outlet ports intercepting on one side of the diaphragm area a portion thereof to isolate it from the corresponding chamber and thereby effectively reduce the diaphragm surface extending into said chamber whereby the diaphragm is maintained in stable position by said source fluid introduced at said inlet ports reacting on differing diaphragm areas on opposite sides of said diaphragm pending a further trigger signal.

2. A system as defined in claim 1 wherein the trigger signal means comprises a vent momentarily releasing fluid from said source flowing through one of said chambers, and including means maintaining both outlet ports in a static condition sealed to prevent fluid flow out of said outlet ports, thereby controlling continuous fluid power from said source with low powered momentary trigger signals and making said system operable with a single fluid source pressure.

3. A system as defined in claim 2 wherein a load device is coupled to at least one of said outlet port means operable from flow of fluid through the corresponding said element chamber, whereby continuous flow of fluid to said load device is controlled by said trigger pulse.

4. A system as defined in claim 1 wherein the means introducing fluid pressure into one inlet port has a restriction thereby causing said diaphragm to attain a preferred state upon initial introduction of said fluid from said source.

5. A system as defined in claim 1 wherein a load device is coupled to both said outlet port means operable with momentary fluid flow through the corresponding chambers and thereafter presenting a closed fluid flow path.

6. A system as defined in claim 5 wherein said load device comprises slave logic gating elements with a diaphragm separating two chambers, one said slave element being coupled to each said outlet port means by a chamber having only inlet port means to thereby present said closed fluid path.

7. A system as defined in claim 6 wherein the second chamber in both said slave elements has a vented port and a further controlled port blocked in one diaphragm position, and the combination further comprising a bistable logic element having a diaphragm movable to block a selected one of two outlet ports in response to fluid pressure at the respective said controlled ports of said slave elements and having inlet ports commonly coupled to said source of fluid to pass fluid from said source to one outlet port indicated by signals received from said slave elements.

8. A system as defined in claim 7 including a reciprocating device operable from fluid flowing through said bistable element outlet ports to reciprocate in opposite directions in response to trigger signals controlling said first mentioned logic element.

9. A system as defined in claim 8 wherein said reciprocating device is a piston, and a path for fluid exhaust from movement of said piston is connected through said further chambers of said slave elements.

10. A fluid operated system comprising a plurality of fluid operated logic elements each having two chambers separated by a diaphragm movable thereinto to control at least one fluid flow path therethrough, a source of fluid under pressure, and circuit means with connection paths from said source through fluid flow paths in said elements, means providing an operation sequence of moving diaphragms of said elements initiated by a trigger signal comprising a fluid pressure change instituting a momentary flow of fluid through at least one of said elements and sealing means comprising at least one of said elements disposed to provide a static condition with all fluid flow paths through the elements closed to prevent leakage of fluid from said source.

11. A system as defined in claim 10 comprising a bistable element having two inlet ports coupled to said source and two outlet ports controlled by said diaphragm, and wherein said sealing means comprise two slave elements with one closed chamber having only one port thereinto coupled to respective ones of said outlet ports of the bistable element.

12. A fluid operated logic system comprising a plurality of fluid operated logic elements each having two chambers separated by a diaphragm movable thereinto to control at least one fluid path therethrough, a source of fluid at a predetermined pressure, output means operable from said fluid at said pressure, a fluid flow path from said source through at least a selected one of said elements to operate said output means, a logic fluid flow network connected through said elements to control the positions of a plurality of said diaphragms by establishing fluid at different pressure levels on opposite sides of the diaphragms thereby to connect said fluid flow path from said source to said output means by a predetermined operation sequence, means starting said sequence by a fluid trigger pulse signal reducing fluid pressure below said source pressure at the diaphragm of one of said elements causing it to move into a control position and circuit connections in said network at each element to cause predetermined changes in diaphragm position responsive to fluid pulse signals reducing fluid pressure received from a different element.

* * * * *